March 26, 1957 — L. S. WILLIAMS — 2,786,438
CORD DRIVE FOR A LENS CELL
Filed Dec. 3, 1953 — 3 Sheets-Sheet 1
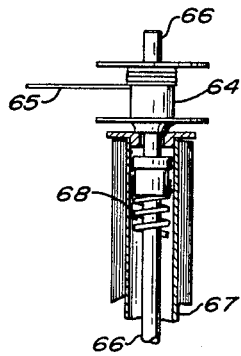
Fig. V
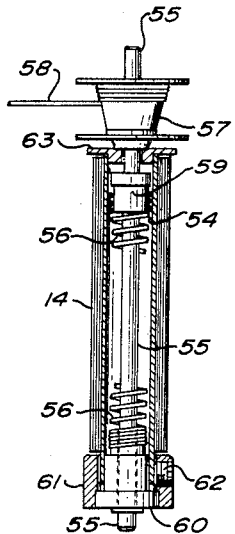
Fig. I     Fig. IV
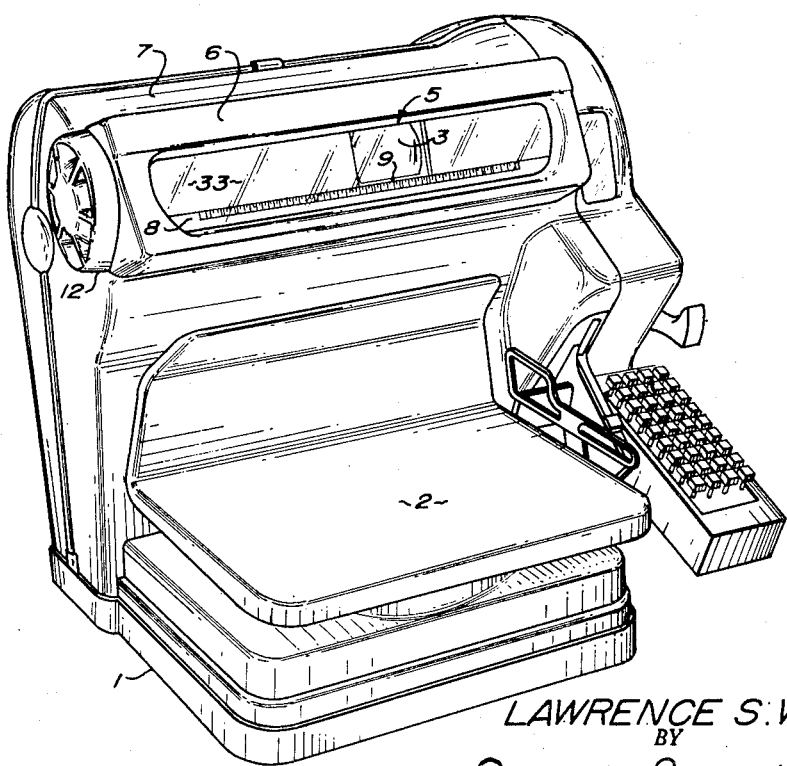
INVENTOR.
LAWRENCE S. WILLIAMS
BY
Marshall, Marshall & Gerstring
ATTORNEYS March 26, 1957  L. S. WILLIAMS  2,786,438
CORD DRIVE FOR A LENS CELL
Filed Dec. 3, 1953  3 Sheets-Sheet 2
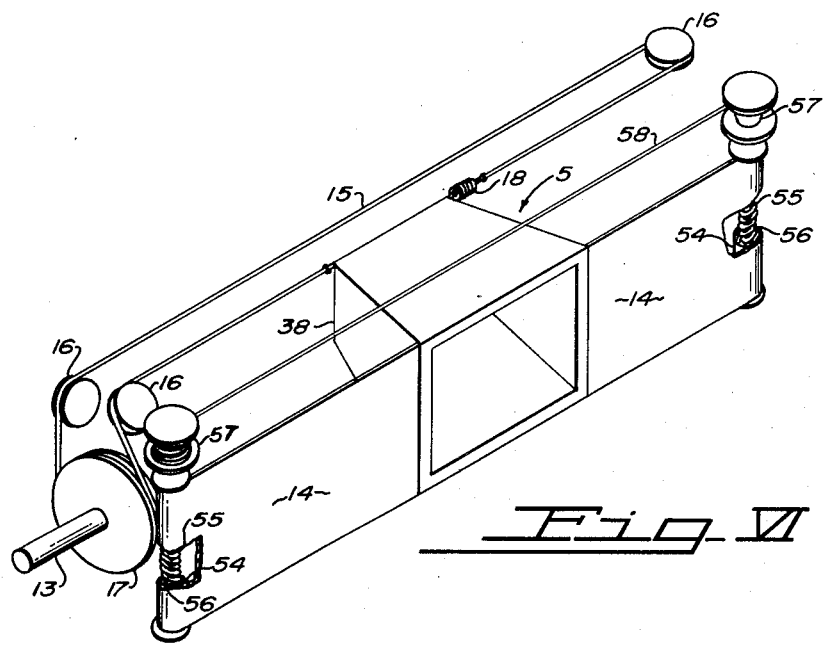
Fig. VI
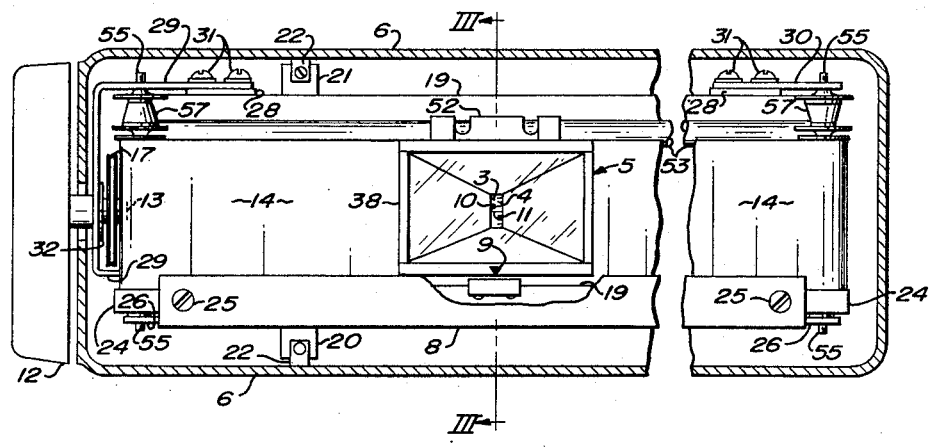
Fig. II
INVENTOR.
LAWRENCE S. WILLIAMS
BY
Marshall, Marshall & Yeasting
ATTORNEYS March 26, 1957  L. S. WILLIAMS  2,786,438
CORD DRIVE FOR A LENS CELL
Filed Dec. 3, 1953  3 Sheets-Sheet 3
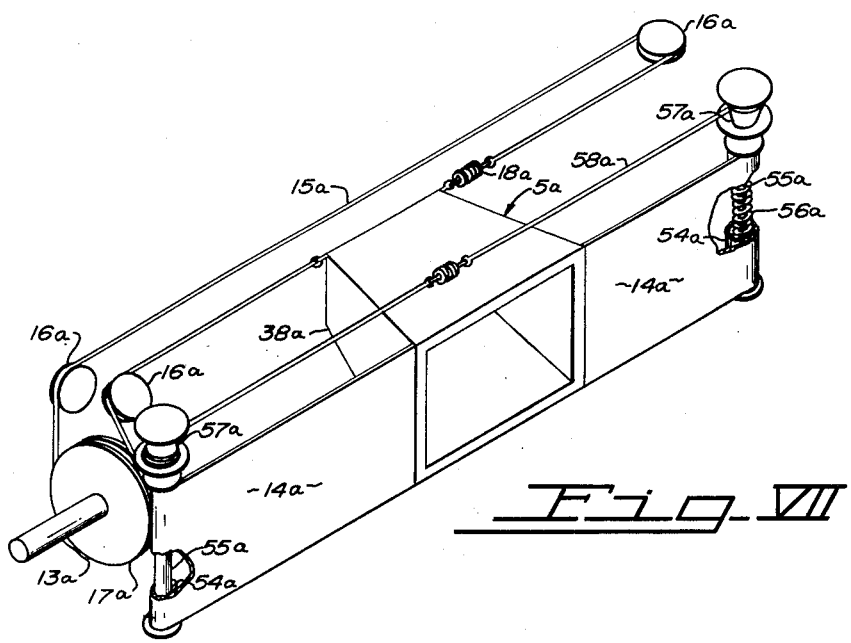
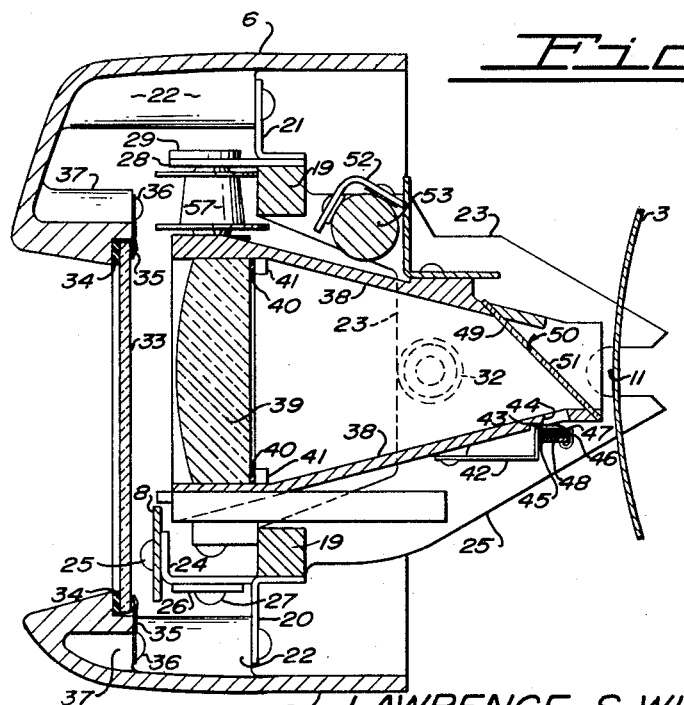
INVENTOR.
LAWRENCE S. WILLIAMS
BY
Marshall, Marshall & Yeasting
ATTORNEYS

United States Patent Office 2,786,438
Patented Mar. 26, 1957

2,786,438

CORD DRIVE FOR A LENS CELL

Lawrence S. Williams, Toledo, Ohio, assignor to Toledo Scale Company, Toledo, Ohio, a corporation of New Jersey Application December 3, 1953, Serial No. 396,041

4 Claims. (Cl. 116—129)

This invention relates to weighing scales in which a lens assembly slidably mounted in a housing and positionable along a reading line of a cylindrical chart selectively cooperates with circumferentially arranged columns of indicia to provide magnified images of the indicia adjacent the reading line and flexible opaque curtains attached to the lens assembly extend along the path of the assembly to conceal those portions of the chart and reading line not in the field of view of the lens, and in particular to an improved drive for such lens assembly and curtains.

Heretofore, computed value weighing scales, i. e. weighing scales that display on a chart the weight of the commodity and the value as computed at a number of selected prices, have been provided with a movable lens assembly that is positionable according to the price of the commodity and have been provided with curtains extending from the lens assembly to conceal those portions of the chart not in the field of view of the lens. The movable lens assembly and the curtains on such computed value weighing scales have been driven by means of a chain and sprocket drive including a train of bevel and spur gears that transmit power to a sprocket driving a ladder chain.

Computed value weighing scales equipped with a movable lens assembly driven by a chain and sprocket drive have been inconvenient to manufacture or use because of the complexity of the gear trains employed to transmit power to the sprocket driving the chain. The gears for such gear trains are expensive to cut and when in operation for a short time become noisy. Furthermore, such gear trains turn too slowly to give the speed demanded by today's users of commercial weighing scales.

The principal object of this invention is to provide a simplified drive for the lens assembly which drive simultaneously positions curtains on either side of the lens assembly.

Another object of the invention is to provide a rapid drive for moving the lens assembly and the curtains which drive is convenient to operate and is silent in operation.

A further object of the invention is to provide a simplified gear-less drive for moving the lens assembly and the curtains which curtains are maintained under tension without impeding movement of the lens assembly.

More specific objects and advantages are apparent from the following description of a specific embodiment of the invention.

According to the invention, a weighing scale having a cylindrical chart with a plurality of columns of value indicia therearound, a movable lens assembly, settable according to the price of a commodity, that cooperates with the value indicia, and flexible opaque curtains extending from the lens assembly to conceal the unused portions of the chart is provided with a simplified drive for moving the lens assembly and the curtains. The simplified drive includes a cord connected to the lens assembly and extending around a looped path, a hand wheel, and a pulley frictionally engaging the cord for driving the lens assembly. The curtains are wound on curtain take up spools at each end of the path of the lens assembly which spools are rotatively urged in a direction to wind the curtains on the spools in a manner such that the curtains are maintained under tension without impeding movement of the lens assembly.

The invention may be more readily understood from the following detailed description of a specific embodiment in which description reference is made to the accompanying drawings:

In the drawings:

Figure I is a perspective view of a computed value weighing scale having an improved drive for moving the lens assembly and the curtains.

Figure II is a front elevational view with parts broken away and other parts shown in section to illustrate the positions, in the lens assembly housing, of the lens assembly and the drive mechanism therefor.

Figure III is a vertical sectional view taken along the line III—III of Figure II.

Figure IV is a detailed front elevational view with parts broken away and other parts shown in section to illustrate the construction of the right hand curtain spindle, curtain take up spool, and drum shown in Figure II.

Figure V is a detailed front elevational view with parts broken away and other parts shown in section to illustrate a second embodiment of the construction shown in Figure IV.

Figure VI is a schematic view of the lens assembly, curtains, and the cord drive showing inelastic cord means interconnecting the drums and a spring connecting each drum to the adjacent take up spool.

Figure VII is a schematic view of the lens assembly, curtains, and a cord drive for the lens assembly and curtains showing elastic cord means interconnecting the drums and a spring connecting the right hand drum to the adjacent take up spool.

These specific drawings and the accompanying description are intended merely to illustrate the invention but not to limit its scope.

A weighing scale equipped to print weight, price, and value tickets and provided with a simplified gear-less drive for the lens assembly and the curtains according to the invention comprises a base 1 in which is mounted a lever system supporting a load receiver 2. Conventional load counterbalancing mechanism, erected from the base, is operatively connected to the lever system and is drivingly connected to a rotatable cylindrical chart 3. The chart 3 has a plurality of columns of indicia 4 representing the value or cost of a commodity on the load receiver computed according to various prices, there being one column for each price. The value indicia are displayed to an operator through a lens assembly 5 slidably mounted within a lens assembly housing 6 positioned on the upward forward portion of a scale frame 7 along the chart 3. A price chart 8 mounted within the lens assembly housing 6 cooperates with an index 9 on the lens assembly 5 to identify that one of the columns of value indicia 4 that is located behind an opening 10 of the lens assembly. The lens assembly 5 is traversed along a reading line 11 of the cylindrical chart 3 by manipulation of a hand wheel 12 carried on a shaft 13 extending from the end of the lens assembly housing 6. Flexible opaque curtains 14 extend in each direction from the lens assembly 5 and along the path of movement thereof.

The drive from the hand wheel 12 to the lens assembly 5 includes a first cord 15 connected to the lens assembly 5 and extending around a looped path having one portion extending parallel to the path of the lens assembly over idler pulleys 16. A drive pulley 17 fixed on the shaft 13 remote from the hand wheel 12 frictionally engages the first cord 15 for driving the lens assembly 5. The first cord 15 is kept taut by means of a small spring 18 in its looped path. The drive is very fast, two and one-half to three turns of the hand wheel 12 moves the lens assembly 5 from one end of the lens assembly housing 6 to the other.

The lens assembly housing 6 supports a rigid rectangularly shaped lens assembly and curtain supporting frame comprising lower and upper horizontally extending bars 19 attached, by means of lower ears 20 and upper ears 21 welded to the respective bars 19, to bosses 22 formed on the lens assembly housing 6 and two generally triangularly shaped end plates 23 brazed to the ends of the horizontal bars 19. L-shaped brackets 24, welded one to each end of the lower bar 19, support the price chart 8 which chart is attached to the L-shaped brackets 24 by means of screws 25 and also support lower spool bearing brackets 26 which brackets 26 are attached to the L-shaped brackets 24 by means of screws 27. Plates 28 welded to the upper bar 19 support upper spool bearing brackets 29 and 30 which brackets 29 and 30 are attached to the plates 28 by means of screws 31. The shaft 13 carrying the hand wheel 12 and the drive pulley 17 turns in a brass bearing 32 set in and extending through the upper spool bearing bracket 29 which bracket 29 is rigidly attached at its lower end to the triangularly shaped end plate 23 nearest the hand wheel 12. The drive pulley 17 fixed to the shaft 13 contacts the inner end of the brass bearing 32 and prevents the shaft 13 from being withdrawn from the bearing. A glass sheet 33 is positioned against a soft rubber gasket 34 by a plurality of clips 35 held in place by means of screws 36 turned into bosses 37 formed around the forward edge of the lens assembly housing 6.

The lens assembly 5 includes a lens cell 38 providing a housing for a lens 39 positioned against a plate 40 which plate in turn is positioned against bosses 41 formed on the inner surface of the lens cell 38. The lens cell 38 carries a reading line bracket 42 having a pair of slit plates 43 welded to its side remote from the lens cell to form a narrow slot. The narrow slot formed by the closely adjacent pair of slit plates 43 is located directly below a hole in the reading line bracket 42 which hole in turn is located directly below a corresponding hole 44 in the bottom of the lens cell 38. A downwardly turned edge of the reading line bracket 42 holds a diffusing plate clamp 45 firmly in place against a diffusing plate 46 having a matte finish on its upper side, e. g. a vinyl plastic sheet, which diffusing plate 46 in turn holds a color screen 47, e. g. a piece of colored cellophane, firmly against the pair of slit plates 43. Light from any suitable source shining through a hole 48 in the diffusing plate clamp 45 passes through the stacked diffusing plate 46 and color screen 47 to be focused by the narrow slot formed by the slit plates 43 into a sharp bright colored line upon an inner surface 49 of a glass reading line reflector 50. The inner surface 49 of the reading line reflector 50 is reflective coated and the outer surface 51 of the reading line reflector 50 is non-reflective coated so that a virtual image of the sharp bright colored line is formed upon the cylindrical chart 3 which line is seen by an observer looking through the lens 39 as the reading line 11.

The lens assembly 5 is hung by means of a hook 52 attached to the top of the lens cell 38 from a lens cell guide rod 53, attached at its ends to the end plates 23, extending along the path of movement of the lens assembly 5. Most of the weight of the lens assembly 5 is forward of the guide rod 53 so that the lens assembly tends to rotate counterclockwise about the guide rod as viewed in Figure III. The tendency of the lens assembly 5 to rotate is restricted by the lower horizontally extending bar 19 which bar provides a slide for the lens assembly 5 when it is moved along the lens cell guide rod 53.

When the lens assembly 5 is driven by the first cord 15 connected to the lens cells 38 of the lens assembly 5 (Figure VI), the flexible opaque curtains 14 either side of the lens assembly 5 are wound onto and unwound from curtain take up spools 54 that are sleeved over shafts or spindles 55 which spindles are journaled in the lower spool bearing brackets 26 and in the upper spool bearing brackets 29 and 30. The spools 54 are loose on the spindles 55 and are driven by the curtains 14 when the lens assembly 5 is moved. The spools 54 are resiliently urged in a direction to maintain the curtains 14 under tension without impeding movement of the lens assembly. This is accomplished by resiliently connecting each spindle 55 to its respective curtain take up spool 54 by means of helical springs 56 and by interconnecting drums 57 which are frustums of cones fixed on the upper ends of the spindles 55 and journaled coaxially with each spool with an inelastic second cord 58 which cord 58 is attached to the larger diameter of each drum 57 and is wound about one drum and is unwound from the other drum in a direction opposite to the movement of the curtains for rotatively urging the drums 57 in a direction to wind the curtains on the spools 54.

The spools are resiliently urged in a direction to maintain the curtains under tension without impeding movement of the lens assembly in a second embodiment shown in Figure VII by resiliently connecting one spindle to its respective curtain take up spool, by rigidly connecting the other spindle to its respective curtain take up spool, and by interconnecting the drums with an elastic second cord. The drive from the hand wheel 12 to the lens assembly 5a includes a first cord 15a connected to the lens cell 38a of the lens assembly 5a and extending around a looped path having one portion extending parallel to the path of the lens assembly over idler pulleys 16a. A drive pulley 17a fixed on the shaft 13a frictionally engages the first cord 15a for driving the lens assembly 5a. The first cord 15a is kept taut by means of a small spring 18a in its looped path.

When the lens assembly 5a is driven by the first cord 15a, the flexible opaque curtains 14a either side of the lens assembly 5a are wound and unwound from curtain take up spools 54a that are sleeved over shafts or spindles 55a which spindles are journaled in the lower spool bearing brackets 26 and in the upper spool bearing brackets 29 and 30. The spools 54a are loose on the spindles 55a and are driven by the curtains 14a when the lens assembly 5a is moved. The spools 54a are resiliently urged in a direction to maintain the curtains 14a under tension without impeding movement of the lens assembly. This is accomplished by resiliently connecting one spindle 55a to its respective curtain take up spool 54a by means of a helical spring 56a, by rigidly connecting the other spindle 55a to its respective curtain take up spool 54a, and by interconnecting drums 57a which are frustums of cones fixed on the upper ends of the spindles 55a and journaled coaxially with each spool with an elastic second cord 58a which cord 58a is attached to the larger diameter of each drum 57a and is wound about one drum and is unwound from the other drum in a direction opposite to the movement of the curtains for rotatively urging the drums 57a in a direction to wind the curtains on the spools 54a.

The variable rotation of the curtain take up spools is necessary because the movement of the lens assembly is linear with respect to shaft rotation while the rotation of the spools must vary according to the amount of the curtains that are wound onto the spools. As the curtains are wound onto the spools, the effective diameters of the spools gets larger and larger. To compensate for the variable effective diameters of the spools, to maintain the curtains under constant tension, the drums 57 are frustums of cones and are fixed on the upper ends of the spindles 55 so that one drum is positioned with its larger diameter above its smaller diameter (the right hand drum 57 as viewed in Figure II) and the other drum is positioned with its larger diameter below its smaller diameter (the left hand drum 57 as viewed in Figure II).

A detailed view of the right hand drum, curtain spindle, and curtain take up spool as seen in Figure II is shown in Figure IV. The left hand drum, curtain spindle, and curtain take up spool as seen in Figure II are exactly the same as the foregoing, except that the drum is inverted. When the curtain 14 moves to the right and is wound onto the curtain take up spool 54, the second cord 58 moves to the left and is unwound from the drum 57 to keep the curtain under tension. As the effective diameter of the curtain take up spool 54 increases when the curtain is wound onto the spool, the cord 58 is unwound from an increasing diameter of the drum 57 (frustum of a cone) to keep the curtain under constant tension. Since the ends of the second cord 58 are attached to the larger diameter of each drum 57, and since the drums 57 are positioned inverse to each other, the second cord 58 is always unwound from an increasing diameter of the drum 57 which corresponds to that curtain take up spool 54 winding up a curtain and is always wound upon a decreasing diameter of the drum 57 which corresponds to that curtain take up spool 54 from which a curtain is being unwound.

The drum 57, formed in the shape of a frustum of a cone (Figure IV) is fixed on the spindle 55 and is resiliently connected to the curtain take up spool 54 through the spindle by means of the helical spring 56. The spring 56 is attached at its upper end to a coil anchor collar 59 fixed to the spindle 55 and is attached at its lower end to an adjustable collar 60 loose on the spindle. The adjustable collar 60 is attached to the curtain take up spool 54 by means of a clamp 61 press fitted around the collar 60 and connected to the spool 54 by means of a set screw 62. The top of the curtain take up spool 54 is covered with a cap 63 loose on the spindle 55. The adjustable collar 60 permits the tension in the system to be adjusted, since when the set screw is loosened, by turning the collar 60 relative to the curtain take up spool 54 the spring 56 can be twisted or untwisted relative to the spool and by turning the spindle 55 relative to the curtain take up spool 54 the second cord 58 can be adjusted by winding or unwinding the cord onto or from the drum 57.

A second form of the drum is shown in Figure V wherein the drum is a right cylinder. Although the frustum of a cone is the preferred shape for the drum so that the curtains are maintained under constant tension, for installations, where it is desired to offset perfection in the constancy of tension with economy in forming the drums, the right cylinder drum is desirable. The drum 64, formed in the shape of a right cylinder, to which is attached a second cord 65 (Figure V) is fixed on a spindle 66 and is resiliently connected to a curtain take up spool 67 through the spindle by means of a helical spring 68. The right cylinder drum 64 may be substituted in place of any of the drums formed in the shape of a frustum of a cone shown in Figures II, III, IV, VI and VII.

Various changes may be made in the details of construction and in the arrangement of the several parts within the scope of the claims without departing from the spirit of the invention.

Having described the invention, I claim:

1. In a weighing scale in which a lens assembly slidably mounted in a housing and positionable along a cylindrical indicia bearing chart selectively cooperates with circumferentially arranged columns of indicia to provide magnified images of such indicia and flexible opaque curtains attached to the lens assembly extend along the path of the assembly to conceal those portions of the chart not in the field of view of the lens, means for driving the lens assembly and curtains comprising a cord connected to the lens assembly and extending around a looped path having one portion extending parallel to the path of the lens assembly, a hand wheel and pulley frictionally engaging the cord for driving the lens assembly, a curtain take up spool at each end of the path of the lens assembly, means journaling each take up spool, a drum journaled coaxially with each spool, means connecting each drum to the adjacent take up spool, and cord means interconnecting the drums for rotatively urging said drums in a direction to wind the curtains on the connected spools, at least one of said connecting means including a coil spring which is adjustable relative to its respective take up spool for maintaining said curtains under adjustable tension.

2. The means for driving the lens assembly and curtains according to claim 1 wherein the drums are right cylinders.

3. In a weighing scale in which a lens assembly slidably mounted in a housing and positionable along a cylindrical indicia bearing chart selectively cooperates with circumferentially arranged columns of indicia to provide magnified images of such indicia and flexible opaque curtains attached to the lens assembly extend along the path of the assembly to conceal those portions of the chart not in the field of view of the lens, means for driving the lens assembly and curtains comprising a cord connected to the lens assembly and extending around a looped path having one portion extending parallel to the path of the lens assembly, a hand wheel and pulley frictionally engaging the cord for driving the lens assembly, a curtain take up spool at each end of the path of the lens assembly, means journaling each take up spool, a drum journaled coaxially with each spool, means connecting each drum to the adjacent take up spool, and elastic cord means interconnecting the drums for rotatively urging said drums in a direction to wind the curtains on the connected spools, one of said connecting means including a coil spring which is adjustable relative to its respective take up spool for maintaining said curtains under adjustable tension.

4. In a weighing scale having a cylindrical chart with a plurality of columns of value indicia therearound, in combination, a frame, a lens housing mounted on the frame along the chart, a lens assembly movably mounted in the lens housing to provide images of selective indicia, drive means comprising a first cord for moving the lens assembly, a shaft journaled in each end of the lens housing transverse to the path of movement of the lens assembly, a drum rigidly attached to an end of each shaft, a pair of flexible opaque curtains one extending in each direction from the lens assembly and along the path of movement thereof, a spool loosely sleeved over each shaft for receiving the curtains, resilient means that connect the spools to the shafts to urge the curtains away from the lens assembly and that each include a coil spring which is adjustable relative to its respective spool, said curtains driving said shafts, and a second cord an end of which is attached to each drum, said second cord being wound about one drum and being unwound from the other drum in a direction opposite to the movement of the curtains to keep the curtains under tension.

References Cited in the file of this patent

UNITED STATES PATENTS

| | | |
|---|---|---|
| 1,918,877 | Templeton | July 18, 1933 |
| 2,570,602 | Shawver | Oct. 9, 1951 |
| 2,678,021 | Karp | May 11, 1954 |